Oct. 15, 1929.   A. E. ANDERSON   1,731,917
AUTOMATIC SWITCHING SYSTEM
Filed Feb. 1, 1927
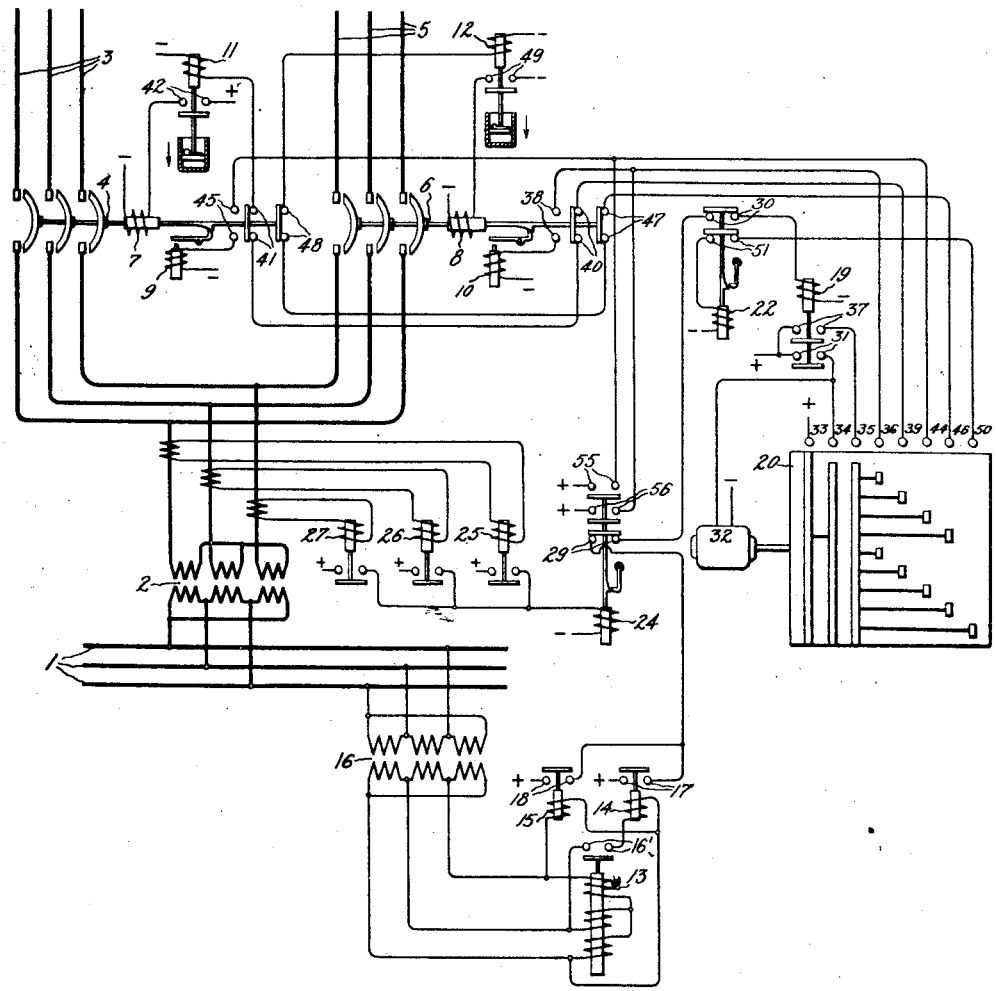
Inventor:
Arvid E. Anderson,
by
His Attorney.

Patented Oct. 15, 1929

1,731,917

UNITED STATES PATENT OFFICE

ARVID E. ANDERSON, OF SCOTIA, NEW YORK, ASSIGNOR TO GENERAL ELECTRIC COMPANY, A CORPORATION OF NEW YORK

AUTOMATIC SWITCHING SYSTEM

Application filed February 1, 1927. Serial No. 165,237.

My invention relates to automatic switching systems and particularly to systems for controlling the connections between a plurality of sources of current and an electric circuit so that the electric circuit is connected to an energized source when one or more of the sources are energized and one object of my invention is to provide an improved control arrangement for accomplishing this result.

My invention has particular utility in a system in which a low voltage circuit is adapted to be supplied from a plurality of high voltage supply circuits through suitable transforming means. High voltage control transformers are very expensive. In accordance with my invention the voltage of the low voltage circuit is utilized as an indication of the condition of the supply circuit connected thereto. In accordance with the preferred embodiment of my invention I provide an arrangement whereby under predetermined electrical conditions of the low voltage circuit, the low voltage circuit is successfully connected to the high voltage supply circuits irrespectively of whether or not they are energized until either a connection is made to an energized line or a predetermined number of connections have been effected to each supply circuit. Preferably means are also provided for preventing the switching means from effecting the connection to any supply circuit under certain abnormal current conditions.

My invention will be better understood from the following description taken in connection with the accompanying drawing and its scope will be pointed out in the appended claims.

In the accompanying drawing, which is a diagram of a control system for controlling the connection between a low voltage distributing bus and two high voltage supply circuits, 1 represents a polyphase low voltage distributing bus which is connected to the secondary of a polyphase transformer bank 2. The primary of the transformer bank is adapted to be connected to a supply circuit 3 by means of a circuit breaker 4 and to a supply circuit 5 by means of a circuit breaker 6.

The circuit breakers 4 and 6 may be of any suitable type examples of which are well-known in the art. As shown they are of the well-known latched-in type and are provided respectively with the closing coils 7 and 8 and with the tripping coils 9 and 10. The circuits of the closing coils 7 and 8 are controlled respectively by the hesitating control relays 11 and 12.

For reasons heretofore mentioned, it is desirable to control the operation of the circuit breakers 4 and 6 in response to predetermined electrical conditions of the bus 1, which indicate that the supply circuit connected thereto is not in a normal condition. Different abnormal electrical conditions of the supply circuit may be employed to effect the operation of the circuit breakers 4 and 6. In the arrangement shown in the drawing I provide a suitable polyphase reverse phase voltage relay 13 and two low voltage relays 14 and 15 which are connected in any suitable manner, examples of which are well known in the art, whereby either the relay 14 or the relay 15 or both close their contacts in response to a phase failure in any or all phases, a reversal of phase rotation, or a predetermined under voltage on any or all phases. As shown the windings of the relays 13, 14, and 15 are connected to the secondary of a polyphase transformer 16 the primary of which is connected to the bus 1. The circuit of the relay 14 also includes the contacts 16' of the reverse phase relay 13 which are closed when the phase rotation is correct and there is no phase failure on any phase. The low voltage relays 14 and 15 are energized from different phases and are arranged to close their respective contacts 17 and 18 when the voltages of the respective phases decrease below predetermined values.

The relays 14 and 15 control the energizing circuit of a control relay 19 which in turn controls the operation of a motor driven controller 20. The controller is provided with a plurality of contacts and segments which are so connected and arranged that after the controller has been set into operation, it makes one complete revolution irrespectively of the positions of the relays 14 and 15 and during this revolution it closes, in a predetermined sequence, contacts in the circuits of the hesitating control relays 11 and 12 and the tripping coils 9 and 10 so that, first, the circuit breaker in the supply circuit that failed is opened. Then the circuit breaker in the other circuit is closed irrespectively of the condition thereof. If this other supply circuit is energized, the circuit breaker therein remains closed and the controller returns to its normal position without effecting any further operation of the circuit breakers. If, however, this other supply circuit is not energized, the controller effects the opening of the circuit breaker therein after it has been closed a certain length of time and the reclosing of the circuit breaker in the supply circuit that failed. So long as both circuits are deenergized, the controller effects the alternate opening and closing of the two circuit breakers a predetermined number of times.

If the voltage or phase conditions of the bus 1 are still abnormal after the controller 20 has effected the predetermined number of operations of the circuit breakers 4 and 6, the controller effects the operation of a lock-out relay 22 which opens the circuit of the control relay 19 so as to render the controller 20 inoperative to effect further operations of the circuit breakers until the relay 22 has been reset manually or by other suitable means.

In case the faulty voltage or phase condition on the bus is due to a fault in the transformer 2 or on the bus 1 or in the connections between the transformer and the bus, it is desirable to open whichever circuit breaker is closed and to prevent the controller 20 from being operated to effect the closure of any of the circuit breakers. Any suitable protective arrangement, examples of which are well known in the art, may be used for this purpose. In the arrangement shown in the drawing this result is obtained by means of a lock-out relay 24, which when energized opens the circuit of the relay 19 and completes the tripping coil of whichever circuit breaker is closed. Each of the over current relays 25, 26, and 27, which are respectively energized in accordance with the currents in different phases of the high voltage circuit connected to the transformer 2, is arranged to complete the circuit of the lock-out relay 24. The lock-out relay 24 is held in its energized position in any suitable manner after its coil is deenergized.

The operation of the system shown is as follows: When one of the circuit breakers is closed and normal voltage and phase conditions exist on the bus 1 the contacts 16' of relay 13 are closed and the contacts 17 and 18 of relays 14 and 15 respectively are open so that the control relay 19 is deenergized and the controller 20 is in the position shown. For the purpose of this description it will be assumed that the circuit breaker 6 is closed so that the supply circuit 5 is supplying current to the bus 1 and that the voltage on all three phases of the supply circuit 5 fails. Consequently the relays 14 and 15 close their respective contacts 17 and 18 so that the circuit of the coil 19 is completed across a suitable control source. This circuit also includes contacts 29 of the lock-out relay 24 and contacts 30 of the lock-out relay 22.

It will be observed that in the arrangement shown a failure of voltage on any phase or a reversal of the phase rotation will also effect the completion of the circuit of the relay 19.

The relay 19 by closing its contacts 31 completes an energizing circuit for the motor 32 which drives the controller 20. The controller begins to rotate and first closes a circuit, through its contacts 33 and 34, which is parallel with the contacts 31 of relay 19. The segments on the controller 20 are so arranged that the circuit through the contacts 33 and 34 is completed at all times except when the controller is in its normal or off position. Therefore, after the controller is once started it makes one complete revolution irrespectively of the position of the relay 19.

The controller 20 next completes a circuit through its contacts 35 and 36 for the tripping coil 10 to effect the opening of the circuit breaker 6. This circuit is from one side of a suitable control source through contacts 37 of relay 19, contacts 35 and 36 of the controller, auxiliary contacts 38 on the circuit breaker 6, tripping coil 10 to the other side of the control source.

The controller 20 next completes a circuit through its contacts 35 and 39 for the hesitating control relay 11. This circuit is from one side of a suitable control source through contacts 37 of relay 19, contacts 35 and 39 of the controller 20, auxiliary contacts 40 on the circuit breaker 6, auxiliary contacts 41 on the circuit breaker 4, coil of relay 11 to the other side of the control source. The relay 11, by the closing of its contacts 42, completes the circuit of the closing coil 7 so that the circuit breaker 4 is closed.

If the supply circuit 3 is energized so that the voltage and phase conditions of the bus 1 are restored to normal, the contacts 17 and 18 are both open and the relay 19 becomes deenergized so that further rotation of the controller does not cause the circuit breaker 3 to open and the circuit breaker 6 to be reclosed. The controller merely returns to its normal position where the circuit of the motor 32 through contacts 33 and 34 is broken.

If, however, the circuit 3 is not energized in the proper manner to restore the normal voltage and phase conditions on the bus 1, the relay 19 remains energized so that the controller 20 next completes a circuit through its contacts 35 and 44 for the tripping coil 9 to open the circuit breaker 4. The circuit of the tripping coil also includes the contacts 31 of relay 19 and the auxiliary contacts 45 on the circuit breaker 4.

The controller 20 next completes a circuit through its contacts 35 and 46 for the hesitating control relay 12. This circuit is from one side of a suitable control source through contacts 37 of relay 19, contacts 35 and 46 of the controller 20, auxiliary contacts 47 on circuit breaker 6, auxiliary contacts 48 on circuit breaker 4, coil of relay 12 to the other side of the control source. The relay 12 by closing its contacts 49 completes the circuit of the closing coil 8 so that the circuit breaker 6 is closed.

If the supply circuit 5 has been restored to its normal operating condition the relay 19 becomes deenergized so that the controller 20 returns to its normal position without effecting any further operation of the circuit breakers. If, however, the supply circuit 5 is still in an inoperative condition so that the relay 19 remains energized further rotation of the controller effects further opening and closing of the respective circuit breakers in the manner described so long as both supply circuits are in an inoperative condition. The number of times each circuit breaker is closed by one revolution of the controller depends upon the number of segments thereon. As shown in the drawing the controller is arranged to complete the circuit of each closing and tripping coil two times during each revolution, but it is obvious that the controller may be arranged to close these circuits any desired number of times.

The controller 20 is also provided with the contact 50 which is arranged to be connected to the contact 35 by segments on the controller after it has effected the desired number of operations of the circuit breakers 4 and 6 and before it reaches its normal position. If the voltage or phase conditions are not normal when the controller connects the contacts 35 and 50 together a circuit is completed for the lockout relay 22. This circuit is from one side of a suitable control source through contacts 37 of relay 19 which is energized, contacts 35 and 50 of the controller 20, contacts 51 of the lockout relay 22, coil of the lockout relay 22 to the other side of the control source. The relay 22, by opening its contacts 30 in the circuit of the relay 19, deenergizes the relay 19 so that after the controller 20 reaches its normal position further energization of the motor 32 is prevented until the lockout relay 22 is restored to its normal position by hand. The relay 22, by opening its contacts 51, opens its own energizing circuit.

As shown in the drawing the last circuit to be completed by the controller 20 before it reaches its lockout position is the circuit for the hesitating control relay 12 so that the circuit breaker 6 is closed when the controller is locked out. In some cases it may be desirable to have both circuit breakers open when the controller is locked out. This result may be obtained in the arrangement shown in the drawing by omitting the last segment of the controller which engages the contact 46.

In case an overload occurs in the transformer bank 2 or on the bus 1 which causes one of the overload relays 25, 26, and 27 to close its contacts, the lockout relay 24 is energized and moves to its lockout position. The relay 24 by opening its contacts 29 opens the circuit of the relay 19 so that the controller 20 is inoperative to effect any further operation of the circuit breakers 4 and 6. The relay 24, by closing its contacts 55, completes a circuit for the tripping coil 9 if the circuit breaker 4 is closed and, by closing its contacts 56, completes a circuit for the tripping coil 10 if the circuit breaker 6 is closed. Therefore, when the lockout relay 24 is energized it effects the opening of whichever circuit breaker is closed and also prevents the controller from opening and closing the respective circuit breakers.

While I have in accordance with the patent statutes shown and described my invention as applied to a particular system and as embodying various devices diagrammatically indicated, changes and modifications will be obvious to those skilled in the art and I, therefore, aim in the appended claims to cover all such changes and modification as fall within the true spirit and scope of my invention.

What I claim as new and desire to secure by Letters Patent of the United States is:

1. In combination, an electric circuit, a plurality of sources of current, means for connecting said circuit to each of said sources, and means responsive to a predetermined electrical condition of said electric circuit for controlling the operation of said connecting means so as to effect the successive connection of said circuit to said sources a plurality of times with predetermined time intervals between successive connections of said circuit.

2. In combination, a plurality of high-voltage supply circuits, a low-voltage circuit, transforming means adapted to be connected between each supply circuit and said low voltage circuit, switching means in each supply circuit, and means responsive to a predetermined electrical condition of said low-voltage circuit for controlling said switching means so as to effect the successive connection of said low-voltage circuit to said high-voltage supply circuits a plurality of times with predetermined time intervals between successive connections of said low voltage circuit.

3. In combination, an electric circuit, a plurality of sources of current, a circuit breaker associated with each source for connecting it to said circuit, and means responsive to a predetermined electrical condition of said circuit for effecting the opening and closing of said circuit breakers in a predetermined sequence to effect, while said predetermined electrical condition of said circuit exists, the successive connection of said circuit to said sources irrespectively of the conditions thereof.

4. In combination, an electric circuit, two sources of current, a circuit breaker associated with each source for connecting it to said circuit, and means responsive to a predetermined voltage condition of said circuit for effecting the opening and closing of said circuit breakers in a predetermined sequence to effect, while said predetermined voltage condition of said circuit exists, the connection of said circuit alternately to said sources irrespectively of the condition thereof.

5. In combination, a plurality of high voltage supply circuits, a low voltage circuit, transforming means adapted to be interconnected between said supply circuits and said low-voltage circuit, a circuit breaker in each supply circuit, and means responsive to a predetermined electrical condition of said low-voltage circuit for effecting the opening and closing of said circuit breakers in a predetermined sequence to effect the successive connection of said low-voltage circuit to said high-voltage supply circuits irrespectively of the conditions thereof.

6. In combination, a plurality of high-voltage supply circuits, a low-voltage circuit, transforming means adapted to be interconnected between said supply circuits and said low-voltage circuit, switching means in each supply circuit, a motor driven controller arranged to control the operation of said switching means in a predetermined sequence, and means responsive to a predetermined electrical condition of said low-voltage circuit for effecting the operation of said motor driven controller.

7. In combination, two high-voltage supply circuits, a low-voltage circuit, transforming means adapted to be interconnected between said supply circuits and said low-voltage circuit, a circuit breaker in each supply circuit comprising a closing coil and a tripping coil, a motor driven controller arranged to effect the successive energization of said closing and tripping coils in such a manner that said circuit breakers are successively closed and opened in a predetermined order, and a relay controlled by the voltage of said low-voltage circuit for effecting the operation of said controller when the voltage of said low-voltage circuit decreases below a predetermined value.

8. In combination, an electric circuit, a plurality of sources of current, a circuit breaker associated with each source for connecting it to said circuit, means responsive to a predetermined electrical condition of said circuit for effecting the opening and closing of said circuit breakers in a predetermined order to effect when said predetermined electrical condition of said circuit exists the successive connection of said circuit to said sources irrespectively of the conditions thereof, and means arranged to be operated automatically to prevent said first mentioned means from effecting further successive operations of said circuit breakers after it has effected a predetermined number of operations of said circuit breakers.

9. In combination, a plurality of high-voltage supply circuits, a low-voltage circuit, transforming means adapted to be interconnected between said low-voltage circuit and each of said supply circuits, a circuit breaker in each supply circuit, a motor driven controller arranged to effect the opening and closing of said circuit breakers in a predetermined order, means responsive to a predetermined voltage condition of said low-voltage circuit for effecting the operation of said controller, and means controlled by said controller and voltage responsive means for rendering said controller inoperative to effect further opening and closing of said circuit breakers when said voltage responsive means is in a position to effect the operation of said controller and said controller is in a predetermined position.

10. In combination, an electric circuit, a plurality of sources of current, a circuit breaker associated with each source for connecting it to said circuit, means responsive to a predetermined electrical condition of said circuit for effecting the opening and closing of said circuit breakers in a predetermined order to effect when said predetermined electrical condition of said circuit exists the successive connection of said circuit to said sources irrespectively of the conditions thereof, and protective means arranged to be operated in response to a predetermined abnormal condition on said circuit for effecting the opening of any of said circuit breakers that may be closed and for preventing said first mentioned means from effecting the successive opening and closing of said circuit breakers.

11. In combination, a plurality of high-voltage supply circuits, a low-voltage circuit, transforming means adapted to be interconnected between said low voltage circuit and each of said supply circuits, a circuit breaker in each supply circuit, a motor driven controller arranged to effect the opening and closing of said circuit breakers in a predetermined order, means responsive to a predetermined electrical condition of said low-voltage circuit for effecting the operation of said controller, and overload responsive means arranged to be operated in response to predetermined overload conditions in said low voltage circuit for effecting the opening of any circuit breaker that may be closed and for preventing the operation of said motor driven controller from being effected by the operation of said means which is responsive to a predetermined electrical condition of said low-voltage circuit.

12. In combination, a source of current, a load circuit, a switch for connecting said source to said circuit, means for closing said switch including an electroresponsive device which when energized effects the closing of said switch, an energizing circuit for said device, a timer which when operated over a predetermined range of movement is adapted to effect the completion of said energizing circuit a plurality of times with predetermined time intervals between successive completion thereof, and load circuit voltage responsive means for effecting the operation of said timer when the load circuit voltage decreases below a predetermined value and for controlling the energizing circuit of said electroresponsive means independently of said timer so that said timer when operating through said predetermined range of movement effects the completion of said energizing circuit only when the voltage of the load circuit is below a predetermined value.

13. In combination, a source of current, a load circuit, a switch for connecting said source to said circuit, electroresponsive means arranged when energized to effect the closing of said switch, a timing device arranged during a predetermined range of movement thereof to effect the closing of said switch a plurality of times with predetermined time intervals between successive reclosures, means responsive to the voltage of said load circuit for initiating said predetermined movement of said timing device when the load circuit voltage decreases below a predetermined value, and means controlled by said voltage responsive means for controlling the energization of said electroresponsive means independently of said timing device so that the energization of said electroresponsive means is effected by said timing device during said predetermined range of movement thereof only when the voltage of the load circuit is below a predetermined value.

14. In combination, a source of current, a load circuit, a switch for connecting said source to said circuit, electroresponsive means arranged when energized to effect the closing of said switch, a circuit for said electroresponsive means, contacts in said last mentioned circuit, means dependent upon the position of said switch for controlling said contacts, other contacts in said last mentioned circuit, a timing device arranged during a predetermined range of movement thereof to effect the closing of said other contacts a plurality of times with predetermined time intervals between successive reclosures thereof, and means responsive to the load circuit voltage for initiating independently of the position of said circuit breaker the operation of said timing device through said predetermined range of movement when the load circuit voltage decreases below a predetermined value.

15. In combination, a source of current, a load circuit, a switch for connecting said source to said circuit, electroresponsive means arranged when energized to effect the closing of said switch, a circuit for said electroresponsive means, series connected contacts in said last mentioned circuit, means controlled by said switch for closing certain of said contacts when said switch is open, a timing device arranged during a predetermined range of movement thereof to effect the closing of other of said contacts a plurality of times with predetermined time intervals between successive closures, and means responsive to the load circuit voltage for initiating the operation of said timing device through said predetermined range of movement when the load circuit voltage decreases below a predetermined value and for controlling independently of said timing device the closing of said other contacts by said timing device so that they are closed during said predetermined range of movement only when the load circuit voltage remains below a predetermined value.

In witness whereof, I have hereunto set my hand this 31st day of January, 1927.

ARVID E. ANDERSON.